Oct. 27, 1970 R. J. REGAN 3,537,022

SIGNAL TRANSLATING CIRCUIT

Filed Jan. 10, 1968

INVENTOR
RICHARD J. REGAN

BY A. C. Smith
ATTORNEY

United States Patent Office 3,537,022

Patented Oct. 27, 1970

3,537,022

SIGNAL TRANSLATING CIRCUIT

Richard J. Regan, Beverly, Mass., assignor to Hewlett-Packard Company, Palo Alto, Calif., a corporation of California Filed Jan. 10, 1968, Ser. No. 696,821
Int. Cl. H03f 1/42, 3/38
U.S. Cl. 330—10 2 Claims

ABSTRACT OF THE DISCLOSURE

An input signal to pulse train duty cycle converter circuit is electrically isolated from external circuitry and pulse timing information is coupled to a pulse train duty cycle-to-output signal converter circuit for providing wide-band direct coupled signal transmission.

SUMMARY OF THE INVENTION

The circuit of the present invention operates on input signals having a wide dynamic range and having a frequency range from D.C. to about 50 kHz. An applied input signal is converted to a representative duty-cycle modulated pulse train in a converter circuit which is electrostatically shielded from surrounding circuitry and pulse timing information is coupled by convenient means such as optical, capacitive or inductive means to a pulse train duty cycle demodulator and output circuit.

DESCRIPTION OF THE PREFERRED EMBODIMENT

Figure 1:
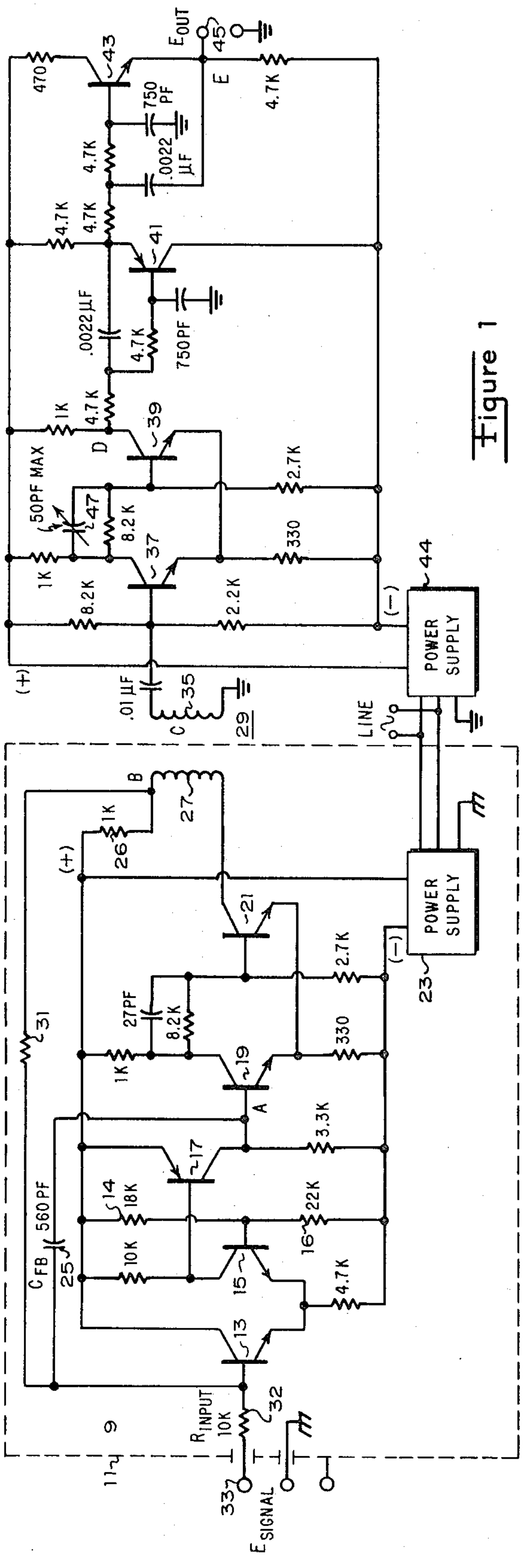
FIG. 1 shows a schematic diagram of an isolated input amplifier according to the present invention.
Figures 2, 3:
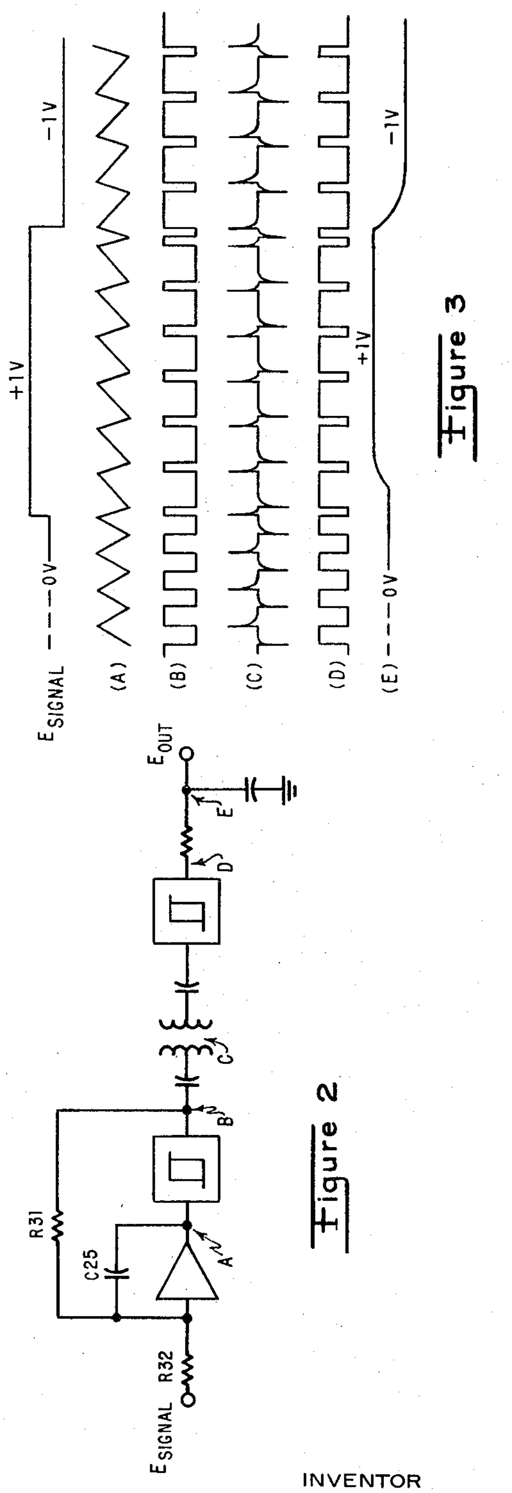
FIG. 2 is a simplified block diagram of the circuit of FIG. 1
FIG. 3 is a graph showing various wave forms present in the circuit of FIG. 1.

Referring now to the figures of the drawing, there is shown an input section 9 which is enclosed by an electrostatic shield 11 for isolation from surrounding circuitry. This input section includes an operational amplifier stage including transistors 13, 15 and 17 followed by a pulse circuit including transistors 19 and 21 connected to operate as a conventional Schmitt trigger circuit. The amplifier stage and trigger circuit within the input section 9 are powered by the line-operated power supply 23 or battery, or the like, which is also enclosed within the electrostatic shield 11. The output of transistor 17 of the amplifier stage is fed back in polarity opposition through the capacitor 25 to the input base of transistor 13 to provide an operational integrator. Thus, the amplitude of signal at the output of transistor 17 is representative of the time-integral of signal, for example, as shown in FIG. 3*a*, applied to the input base of transistor 13. This integrator output signal when applied to the base of transistor 19 in the trigger circuit including the transistors 19 and 21 causes the trigger circuit to switch operating states, as shown in FIG. 3*b*, and produce a change in the current flowing in the resistor 26 and in the primary winding 27 of the transformer 29 serially connected with the resistor 26 in the output circuit of transistor 21. The voltage drop across resistor 26 due to the current in the primary winding 27 is fed back through resistor 31 to the input base of transistor 13 in polarity opposition to the input signal applied thereto through resistor 32 from input terminal 33. This causes the operational integrator to reverse the direction or polarity of the change of output voltage with time, as shown in FIG. 3*a*. This output voltage applied to the Schmitt trigger circuit including transistors 19 and 21 causes the trigger circuit to switch operating states again when the integrator output voltage decreases to a selected level. Thus, the integrator output voltage A varies between the hysteresis limits (i.e. the upper and lower triggering levels of the trigger circuit) in a sawtooth manner (FIG. 3*a*) at a rate which is determined by the integrator time constant and by the magnitude of the input signal (FIG. 3). The trigger circuit output signal B is designed to have a selected pulse rate and a fifty (50) percent duty cycle for zero input signal. Thus, the polarity and amplitude of applied input signal at terminal 33 alter the duty cycle and repetition rate of the generated pulses.

The generated pulses are magnetically coupled C through the electrostatic shield 11 from the primary winding 27 to the secondary winding 35 of transformer 29, as shown in FIG. 3*c*. It is important to note that only the timing information concerning the duty-cycle modulated pulse train (i.e. the timing of the leading and trailing edges) must be coupled from the modulator to the demodulator so that a very simple transformer 29 may be used.

The magnetic coupling between windings 27 and 35 is unaffected by the potential with respect to ground at which the input section within the electrostatic shield 11 is operated so that the input secion may "float" in total electrical isolation from the surrounding circuitry. Of course, the generated pulses from the input section may also be coupled to the output section by other suitable means than transformer 29. For example, an injection electroluminescent diode source optically coupled to a photo diode detector, or the like, may also be used since the pulse coupling provided thereby is not affected by the operating potential of the input section with respect to ground.

The generated pulses from the input section are thus coupled to the input of a pulse generator circuit including transistors 37 and 39 connected to operate as a conventional Schmitt trigger circuit similar to the trigger circuit including transistors 19 and 21. The pulses at the output D of this trigger circuit, as shown in FIG. 3*d*, are thus substantially identical in repetition rate and duty cycle to the pulses produced at the output of the trigger circuit in the input section, as shown in FIG. 3*b*. The filter section E including transistors 41 and 43 is connected to receive the pulses at the output of the trigger circuit including transistors 37 and 39 for converting the received pulses to a steady output voltage on terminal 45, as shown in FIG. 3*e*, which has an amplitude and polarity related to the duty cycle of such received pulses. This steady output voltage is thus an amplified replica of the input signal applied to the input terminal 33. The frequency response of the circuit of the present invention is limited in practice to about 50 kHz. primarily by the filter section including the transistors 41 and 43. The linearity of gain over the dynamic range of applied signal amplitudes is determined primarily by the duty cycle tracking of the two trigger circuits, namely, the one in the input section including transistors 19 and 21 and the one in the output section including transistors 37 and 39. The gain linearity may thus be optimized by varying the coupling capacitance provided by capacitor 47 between the transistors 37 and 39 in the trigger circuit of the output section.

Therefore, the present invention provides extremely linear signal transmission over a wide dynamic range and over a range of signal frequencies from D.C. to about 50 kHz. or more using an input stage which is electrically isolated from surrounding circuitry.

I claim:

1. A signal translating circuit comprising:

integrating means having an input and an output for producing at the output thereof a signal having slope and direction that are representative of the amplitude and polarity, respectively, of signal applied to the input thereof;

a trigger circuit connected to the output of said integrating means and having a pair of triggering signal levels for producing an output with transitions in the level thereof in response to signal received from said integrating means attaining the values of the triggering signal levels;

circuit means connected to the input of said integrating means for applying thereto the combination of signals appearing at said input and at the output of said trigger circuit for producing recurring signal pulses at the output of said trigger circuit having a duty cycle representative of applied signal appearing at said input;

a pulse circuit for producing output pulses in response to trigger signals applied thereto;

coupling means connected to receive said signal pulses from said trigger circuit for applying trigger signals to said pulse circuit, said coupling means providing isolation of electric field coupling between the integrating means and trigger circuit and said pulse circuit; and output means coupled to said pulse circuit for producing an output signal having an amplitude and polarity representative of the timing of said trigger signals determined by the duty cycle of said signal pulses.

2. A signal translating circuit as in claim 1 wherein: said trigger circuit and said pulse circuit include substantially similar bistable circuits capable of operating only in either one of two operating states for operating at substantially identical duty cycles to linearize the relationship of output signal amplitude to applied signal amplitude over a selected range of applied signal amplitudes.

References Cited

UNITED STATES PATENTS

| | | | |
|---|---|---|---|
| 2,919,308 | 12/1959 | Cooke | 328—34 X |
| 3,014,182 | 12/1961 | Shallon | 328—35 X |
| 3,350,569 | 10/1967 | Beck et al. | 307—268 X |
| 3,086,125 | 4/1963 | Gumin et al. | 307—254 X |
| 3,218,478 | 11/1965 | Bernfeld et al. | 330—21 X |
| 3,289,008 | 11/1966 | Sommerfield | 307—253 X |
| 3,296,458 | 1/1967 | Fracassi et al. | 307—235 |

NATHAN KAUFMAN, Primary Examiner

U.S. Cl. X.R.

330—17, 20, 26

UNITED STATES PATENT OFFICE

CERTIFICATE OF CORRECTION

Patent No. 3,537,022 Dated October 27, 1970

Inventor(s) R. J. Regan

It is certified that error appears in the above-identified patent and that said Letters Patent are hereby corrected as shown below:

Column 2, between lines 67 and 68, insert the following paragraph -- an input for receiving an applied signal; --.

SIGNED AND SEALED JAN 19 1971

(SEAL)
Attest:

Edward M. Fletcher, Jr.
Attesting Officer

WILLIAM E. SCHUYLER, JR.
Commissioner of Patents